United States Patent
Lee (10) Patent No.: US 6,755,545 B2
(45) Date of Patent: Jun. 29, 2004

(54) LIGHT GUIDE PLATE FOR BACKLIGHTING A LIQUID CRYSTAL DISPLAY

(75) Inventor: Hea-Chun Lee, Suwon-si (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/859,801

(22) Filed: May 18, 2001

(65) Prior Publication Data

US 2002/0145860 A1 Oct. 10, 2002

(51) Int. Cl.⁷ ............................................. F21V 8/00
(52) U.S. Cl. ........................... 362/31; 362/26; 362/561
(58) Field of Search ........................... 362/26, 31, 551, 362/558, 559, 560, 561; 385/129, 146, 901; 359/599, 639, 640; 349/61, 62, 64, 65

(56) References Cited

U.S. PATENT DOCUMENTS

| | | | | |
|---|---|---|---|---|
| 5,050,946 A | * | 9/1991 | Hathaway et al. ............ 349/64 |
| 5,359,691 A | * | 10/1994 | Tai et al. .................... 362/561 |
| 5,668,913 A | * | 9/1997 | Tai et al. ..................... 362/31 |
| 5,711,589 A | * | 1/1998 | Oe et al. ..................... 362/31 |
| 5,887,964 A | * | 3/1999 | Higuchi et al. ............... 362/31 |
| 5,982,540 A | * | 11/1999 | Koike et al. ................. 349/62 |
| 5,999,685 A | * | 12/1999 | Goto et al. ................. 385/146 |
| 6,151,169 A | * | 11/2000 | Kim ......................... 359/640 |
| 6,454,452 B1 | * | 9/2002 | Sasagawa et al. .......... 362/561 |

* cited by examiner

*Primary Examiner*—Sandra O'Shea
*Assistant Examiner*—Ismael Negron
(74) *Attorney, Agent, or Firm*—McGuireWoods LLP (57) ABSTRACT

A backlight assembly for providing liquid crystal display enhanced brightness of light with a lower consumption of electricity includes a light guide plate having brightness enhancing recesses formed on a bottom surface thereof and light collecting grooves formed on an upper surface thereof. The brightness enhancing recesses efficiently reflect the light having different directions and the light collecting grooves collects the light reflected by the brightness enhancing recesses.

7 Claims, 6 Drawing Sheets

LIGHT GUIDE PLATE FOR BACKLIGHTING A LIQUID CRYSTAL DISPLAY

BACKGROUND OF THE INVENTION

1. Field of the Invention

The present invention relates to a liquid crystal display device, and more particularly to a backlight assembly for increasing a usage efficiency of light generated by a lamp to enhance brightness of light with a lower consumption of electricity and a liquid crystal display device using thereof.

2. Description of the Related Art

In generally, In the liquid crystal display device, a thin film transistor substrate is provided in which a desired voltage is selectively applied to divided regions thereof having a fine area respectively and a color filter substrate is disposed in which a regular voltage is applied to a whole area thereof. Liquid crystal is introduced between the thin film transistor substrate and the color filter substrate, of which a permeability of light is changed with depending on a change of an electric filed between the thin film transistor substrate and the color filter substrate. The voltage corresponding to image data is selectively applied to the divided regions of the thin film transistor substrate in order for the liquid crystal display device to display the images.

The liquid crystal is an element that does not radiate but receive the light, which carries out changing only the permeability of the light according to the change of the electric field between the thin film transistor substrate and the color filter substrate.

It means that the light is required to display the images with correspondence to the image data provided for the liquid crystal display device.

The light required to display the images in the liquid crystal display device is supplied by a natural light source such as sunlight or an artificial light source using electric energy.

When displaying the images is performed by using the natural light source, the liquid crystal display device is light in weight and small in size as a separate device using the electric energy is unnecessary for generating the light. In this case, however, there is a disadvantage in that the liquid crystal display device cannot display the images in the dark.

While it is performed to display the images by using the artificial light source, the liquid crystal display device can display the images anywhere regardless of darkness and brightness. In this case, however, there are disadvantages in that a consumption of electricity increases and the light crystal display device is heavy in weight and large in size.

Especially, when it is taken in consideration that the liquid crystal display device is made for a portable usage, the consumption of the electricity in the liquid crystal display device using the artificial light source is very important. In recent, accordingly, researches have been performed to reduce the consumption of the electricity in the liquid crystal display device even though the artificial light source is adopted to the liquid crystal display device.

Recently, it tends to improve a brightness of the light and a uniformity of the brightness of the light by forming V-shaped grooves or printing reflection dots on a bottom surface of the light guide plate that converts a line light source type of light into a surface light source type of light and changes a pathway of the light emitted from the lamp. When the brightness of the light is improved and the consumption of the electricity is reduced in the liquid crystal display device in such a manner as described above, the efficiency of the light is deteriorated and it is more difficult to further reduce the electricity consumption. Accordingly, it is required for a backlight assembly capable of increasing a usage efficiency of light generated by a lamp to enhance brightness of light with a lower consumption of electricity.

SUMMARY OF THE INVENTION

The present invention has been made to solve the aforementioned problem, and accordingly it is the object of the present invention to provide a backlight assembly for increasing a usage efficiency of light generated by a lamp to enhance brightness of light with a lower consumption of electricity.

It is another object of the present invention to provide a liquid crystal display device having the backlight assembly for increasing a usage efficiency of light generated by a lamp to enhance brightness of light with a lower consumption of electricity.

In order to achieve the first object of the present invention, a backlight assembly comprising, a lamp assembly for generating and emitting light in a first direction, and a first light guide plate for enhancing a brightness of the light, the light guide plate including a body for guiding the light transmitted from the lamp assembly, which has at least one brightness enhancing groove that is formed on a bottom surface thereof and has a polyhedron horn shape.

In order to achieve the second object of the present invention, a liquid crystal display device comprising, a liquid crystal display panel assembly for controlling liquid crystal precisely to display an image and a backlight assembly including a lamp assembly for generating and emitting light in a first direction, a light guide plate for guiding the light provided from the lamp assembly, which has a plurality of the recess for enhancing a brightness of the light formed in a polyhedron horn shape on a bottom surface thereof, optical sheets for transmitting the light Out of the light guide plate and a receptacle for receiving the lamp assembly, the light guide plate and the optical sheets, the receptacle being combined with the liquid crystal display panel assembly.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENTS

Hereinafter, a backlight assembly and a liquid crystal display device using thereof according to preferred embodiment of the present invention will be described in detail with reference to the accompanying drawings.

Figure 1:
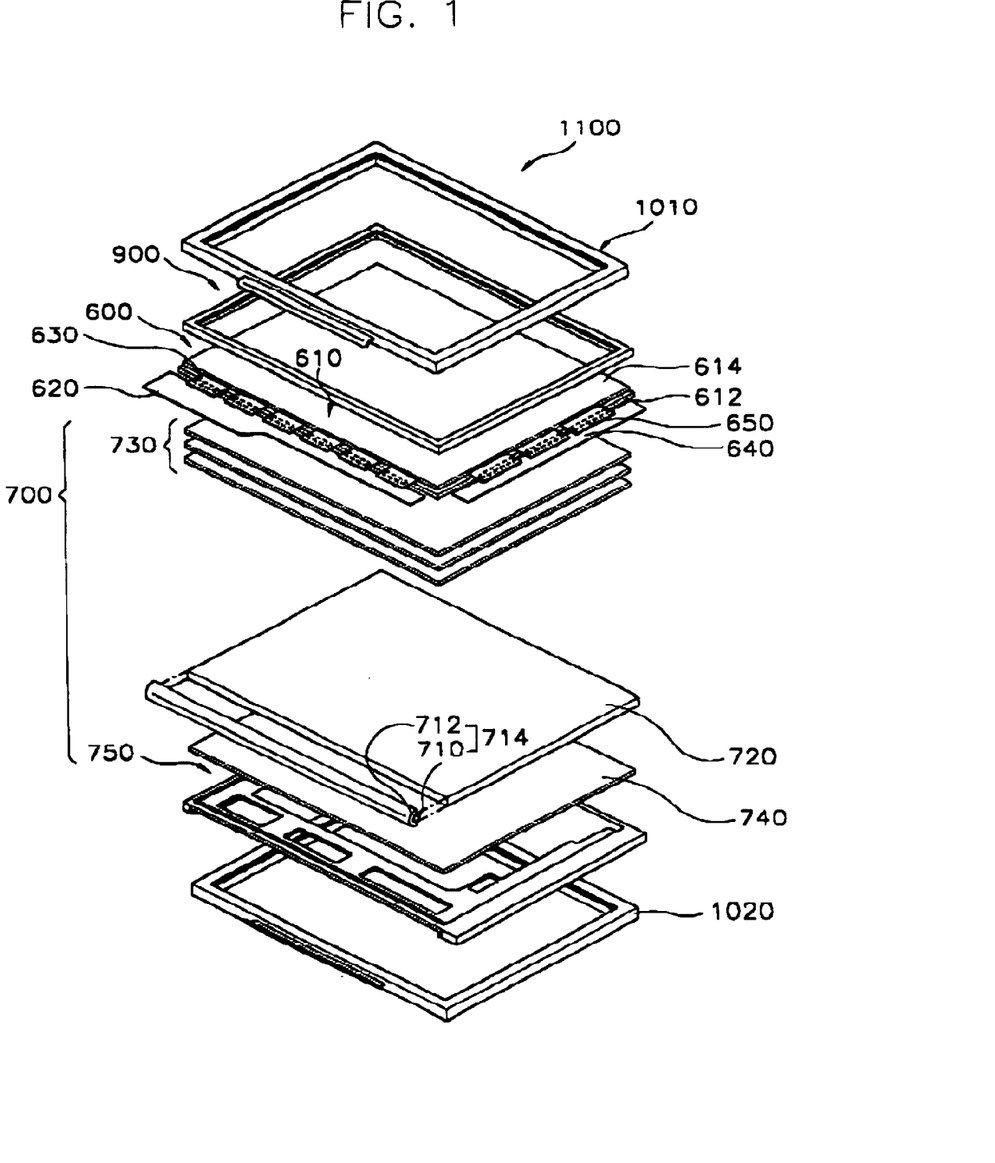
FIG. 1 is an exploded perspective view showing a liquid crystal display device according to an embodiment of the present invention.

FIG. 1 is an exploded perspective view showing a liquid crystal display device according to an embodiment of the present invention.

Referring to FIG. 1, the liquid crystal display device 1100 generally includes a front case 1010 and a rear case 1020, a top chassis 900, a liquid crystal display panel assembly 600 and a backlight assembly.

Firstly, the liquid crystal display panel assembly 600 comprises a thin film transistor substrate 612, a color filter substrate 614, liquid crystals (not shown) data printed circuit board 620, flexible printed circuits 630 and 650, and gate printed circuit board 640 for operating the liquid crystal display panel.

Particularly, the thin film transistor substrate 612 is a transparent glass substrate on which thin film transistors respectively having gate electrodes, source electrodes and drain electrodes are formed in matrix by a process of fabricating semiconductors.

In the process of fabricating semiconductors, the gate electrodes of the thin film transistors in a column are commonly connected to conductive gate lines and the source electrodes of the thin film transistors in a row are commonly connected to conductive data lines. Pixel electrodes, which are made of a transparent and conductive material such as Indium Tin Oxide, are respectively formed on the drain electrodes of all thin film transistors.

With the construction of the thin film transistor substrate 612 as described above, a desired voltage can be selectively applied to divided regions in a fine area unit as electric signals are provided for the data lines and the gate lines in time.

Meanwhile, the color filter substrate 614 is provided so as to face to the thin film transistor substrate 612.

Particularly, RGB pixels are formed on the transparent glass substrate by the process of fabricating the semiconductors and common electrodes are formed on transparent glass substrate after formed RGB pixels. The color filter substrate 614 has RGB pixels arranged regularly thereon to be corresponding to the pixel electrodes that are formed on the thin film transistor substrate 612.

Since the predetermined voltage is applied to the common electrodes, a difference of electric field is presented between the pixel electrodes and the common electrodes according to the voltage applied to the respective pixel electrode.

After the thin film transistor substrate 612 is aligned with the color filter substrate 614 so as to change a permeability of the light depending on the difference of the electric field the liquid crystals are introduced between the thin film transistor substrate 612 and the color filter substrate 614. Then. the thin film transistor substrate 612 and the color filter substrate 614 are sealed.

In order to selectively apply the desired voltage to the respective pixel electrode arranged in matrix, on the other hand, an output terminal of a flexible printed circuit 650 is mounted through an anisotropic conductive film to the gate lines and an input terminal of the flexible printed circuit 660 is connected to a gate printed circuit board 640.

An output terminal of a flexible printed circuit 630 also is mounted through the anisotropic conductive film to the data lines and an input terminal of the flexible printed circuit 630 is connected to a data printed circuit board 620.

Here, the flexible printed circuits 650 and 630, the gate printed circuit board 640 and the data printed circuit board 620 functions as the unit for operating the 10 liquid crystal display panel.

Even though the liquid crystal display panel assembly 600 constructed as described above operates precisely, a desired display characteristic cannot be accomplished when the light is not transmitted from an outside or the light has no sufficient brightness.

In the present invention, the backlight assembly 700 is utilized to provide the light for the liquid crystal display panel 600.

The backlight assembly 700 generally includes optical sheets 730, a lamp assembly 714, a light guide plate 720, a light reflection plate 740 and a receptacle 750.

The lamp assembly 714 has a lamp 710, a lamp cover 712 and an electric line (not shown). A cold cathode fluorescent tube (CCFT) type of lamp as an example is used as the lamp 710. The light emitted radially from the CCFT type of the lamp 710 is collected in a first direction and transmitted to the light guide plate 720 by means of the lamp cover 712.

As the light emitted the first direction from the lamp assembly 714 has a line light shape, a brightness of the light is partially changed when the light in the line light shape reaches a surface having a predetermined area immediately.

To prevent the change of the brightness of the light, the line light source type of the light must be converted into a surface light source type of the light while a pathway for transmitting the light also must be changed. The light guide plate 720 for enhancing the brightness of the light is used to change the pathway and the formation of the surface source type light.

Figure 2:
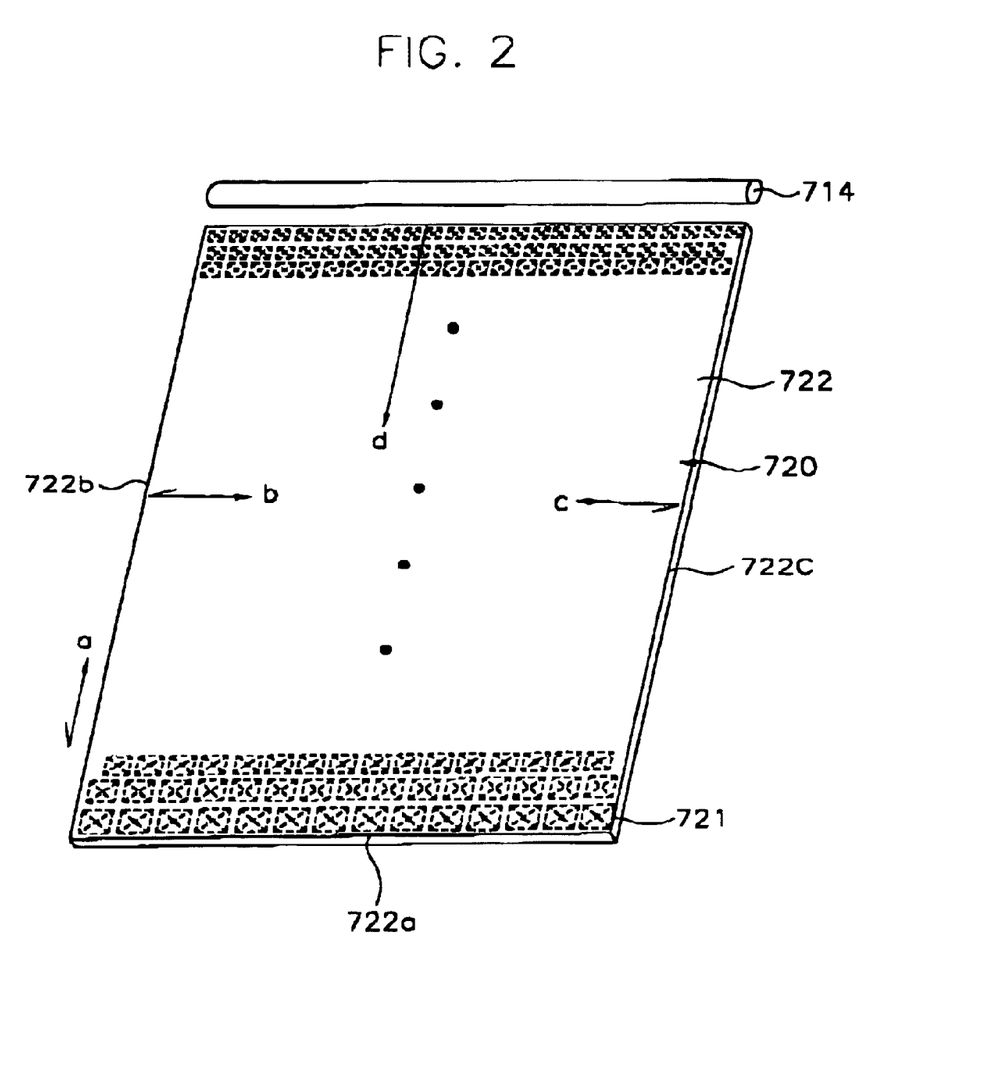
FIG. 2 is a plan view showing a light guide plate capable of enhancing a brightness of light according to the embodiment of the present invention.

FIG. 2 is a plan view of showing the light guide plate 720 for enhancing the brightness of the light according to the one embodiment of the present invention.

The light guide plate 720 for enhancing the brightness of the light includes a body 722 having a brightness enhancing recess 721.

The body 722 of the light guide plate 720 is a plate having a rectangular hexahedron shape and a uniform thickness or a wedge type of plate of which a thickness is gradually reduced from a first end to a second end which is opposite to the first end.

Hereinafter, a principle of enhancing the brightness of the light by means of the recesses 721 will be described as follows.

Firstly, when the light emitted from the lamp assembly 714 is incident into the body 722 of the light guide plate 720, the light proceeds along pathways a, b, c and d as shown in FIG. 2, Particularly, the light proceeds along the pathway a when the light is incident into the body 722 and reflected by a surface 722a of the body 722 of the light guide plate 720. The light proceeds along the pathway b when the light is incident into the body 722 and reflected by a side surface 722b of the body 722 When the light is incident into the body 722 and reflected by the other side surface 722c, the light proceeds along the pathway c. The light is normally transmitted into the body 722 after being incident into the light guide plate 720 and then proceeds along the pathway d.

When grooves having a V shape in a sectional view are formed with parallel to the pathway c or b on a bottom surface of the body 722 of the light guide plate 720 in order to reflect and transmit the light that is incident into the light guide plate 720 toward the liquid crystal display panel assembly 500, the light in the pathway a or b is reflected toward the liquid crystal display panel assembly 600. However, it is difficult to reflect the light in the pathway c or d toward the liquid crystal display panel assembly 600. As a result, an efficiency of the light can be deteriorate.

In order to increase the efficiency of the light, all light in the pathway a, b, c and d must be reflected toward the liquid crystal display panel assembly 600.

According to the one embodiment of the present invention, recesses 721 for enhancing the brightness of the light are formed at the bottom surface of the light guide plate 720 in order to reflect all light moving along the pathways a, b, c and d toward the liquid crystal display panel assembly 600.

For example, the recesses 721 for enhancing the brightness of the light have a polygonal horn shape to reflect all the light.

The recesses 721 for enhancing the brightness of the light are formed in various shapes, for example, a triangular horn shape, a tetragonal horn shape, a pentagonal horn shape, a hexagonal horn shape and the like and may be formed in an injection molding method.

Since the recesses 721 for enhancing the brightness of the light are formed in the polygonal horn shape, the light in the pathway a, b, c and d all is reflected toward the liquid crystal display panel assembly 600.

With an amount of the light in the respective pathway, the amount of the light in the pathway d is more than that of the light in the pathways a, b and c. According to the pathway of the light, the amount of the light is somewhat changed.

When each area of the sidewalls of the recesses 721 is set to be proportional to the amount of the light, the brightness of the light is further improved.

If the amount of the light in the pathway d is the largest, the amount of the light in the pathway a is larger than that of the light in the pathway b and the amount of the light in the pathway c is the most small, the recesses 721 can be formed so that the area of the sidewall facing to the pathway d is the largest, the area of the sidewall facing to the pathway a is larger than that of the sidewall facing to the pathway b, and the area of the sidewall facing to the pathway c is most small.

It means that the area of the sidewalls of the recesses 721 for enhancing the brightness of the light is defined to be proportional to the amount of the light to be reflected by the sidewalls.

Meanwhile, the recesses 721 for enhancing the brightness of the light is formed such in a manner as the recesses are the most small in size at a portion of the body 722 adjacent to the lamp assembly 714 and gradually larger in size at a portion of the body 722 far away from the lamp assembly 714.

The reason for forming the recesses having different size is that the light the light is uniformly reflected through the body 722 of the light guide plate.

It is possible to gain the light having the improved brightness and being diffused by the recesses 721 for enhancing the brightness of the light formed in the bottom surface of the body 722 of the light guide plate.

With the embodiment of the present invention, grooves 726 for collecting the light, which is diffused and reflected by the recesses 721 of the light guide plate body 722 for enhancing the brightness of the light, in the display region is illustrated with reference to FIGS. 3 and 4.

A plurality of grooves 728 is formed in a direction of axis X and in a profile of prism on an upper surface of the body 722 of the light guide plate 720 opposite to the bottom surface in which the recesses 721 for enhancing the brightness of the light are formed, so as to collect and transmit the light reflected and diffused by the recesses 721 for enhancing the light out of the light guide plate 720.

Figure 5:
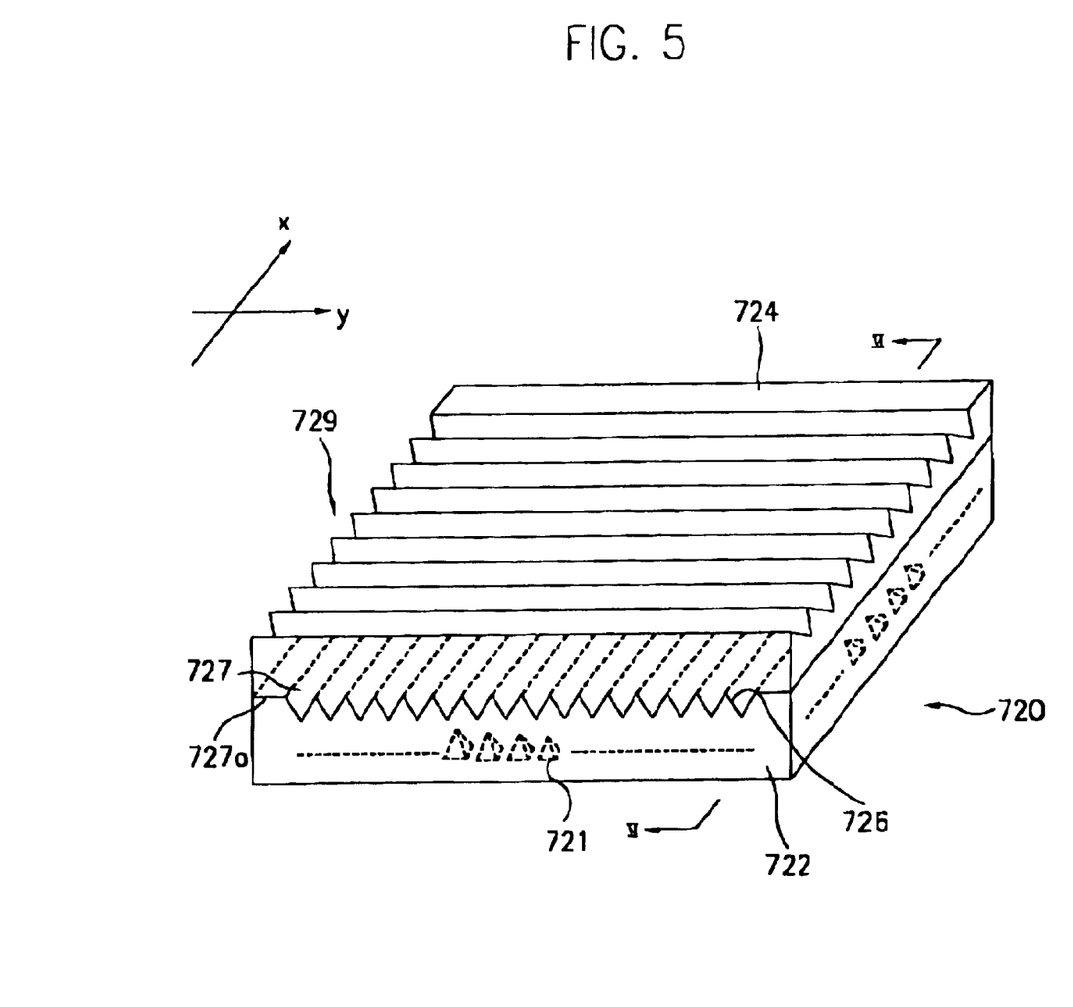
FIG. 5 is a perspective view showing a light guide plate for enhancing a brightness of light and a light guide plate for collecting the light according to the other embodiment of the present invention.
Figure 6:
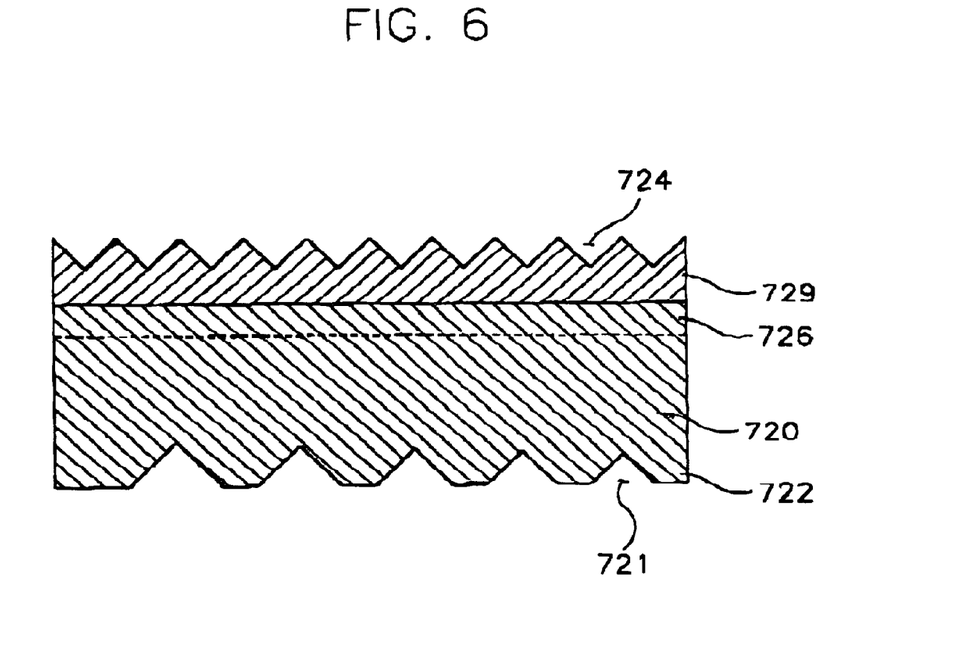
FIG. 6 is a sectional view showing the light guide plate for enhancing a brightness of the light and the light guide plate for collecting the light according to the other embodiment of the present invention, taken along the line VI—VI in FIG. 5.

The other embodiment of the light guide plate 720 for enhancing the brightness of the light is shown in FIGS. 5 and 6.

The light guide plate 720 for enhancing the brightness of the light shown in FIGS. 5 and 6 comprises a body 722 and a second light guide plate body 727.

Figure 3:
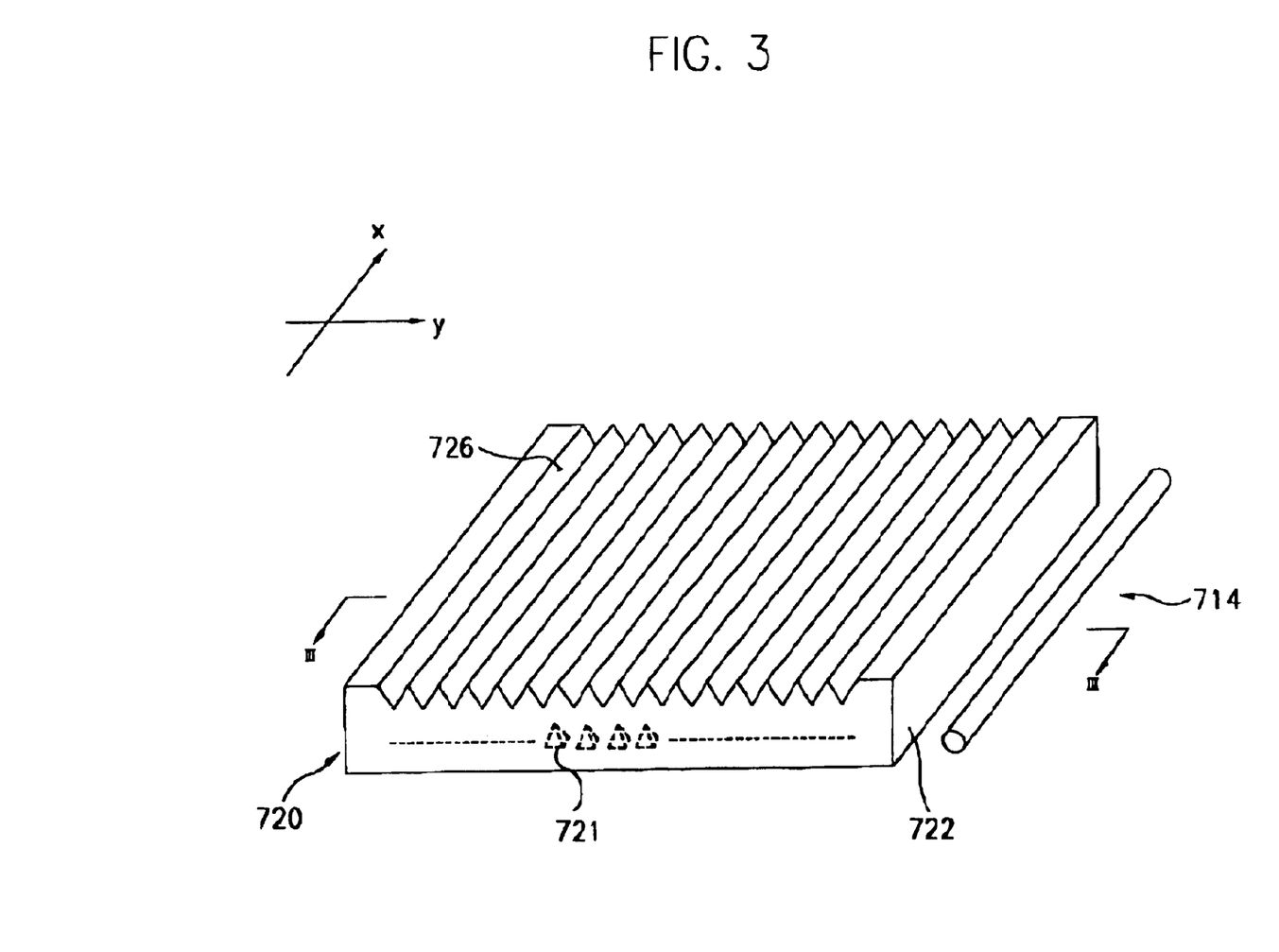
FIG. 3 is a perspective view showing the light guide plate and a lamp according to the embodiment of the present invention.
Figure 4:
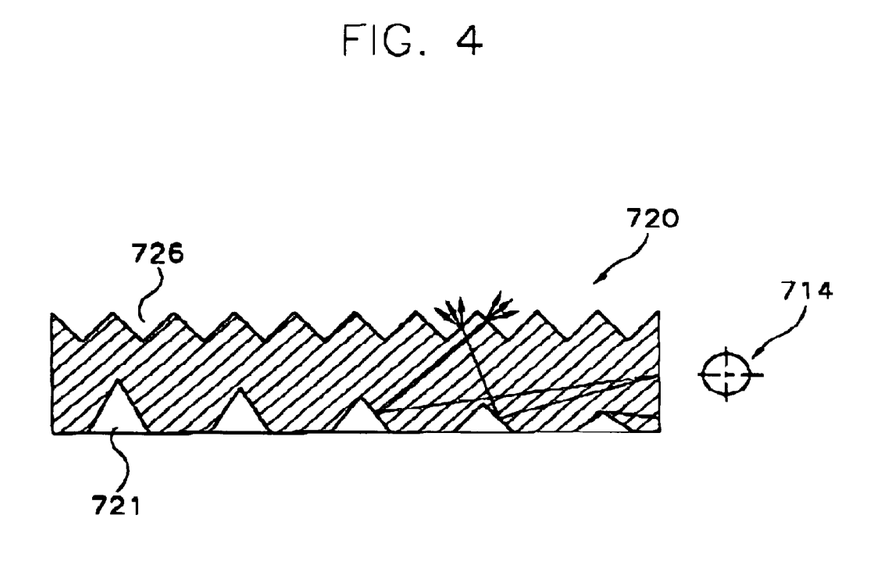
FIG. 4 is a sectional view showing the light guide plate and the lamp according to the embodiment of the present invention, taken along the line III—III in FIG. 3.

The description relating to the body 722 will be omitted since the body 722 has the same shape as that shown in FIGS. 3 and 4.

The second light guide plate body 727 has engagement grooves 727a formed in the bottom surface thereof and light collecting grooves 724 formed on the upper surface thereof. The engagement grooves 727a are engaged with the grooves 726 that are formed on the upper surface of the first light guide plate body 722 to collect the light. The light collecting grooves 724 are parallel with an axis Y and have a prism shape in profile.

As described above, the light guide plate 720, which includes the body 722 and the second light guide plate body 727 in order to enhance the brightness of the light, can perform an improved function of collecting the light and improve the brightness of the light.

When necessary a plurality of diffusion sheets 730 may be formed on the upper surface of the light guide plate 720 for enhancing the brightness of the light according to the embodiment in FIG. 2, another embodiment in FIGS. 3 and 4 and still another embodiment in FIGS. 5 and 6.

Also, the light reflecting plate 740 may optionally be mounted under the light guide plate 720 for enhancing the brightness of the light in order to return the light leaked out of the light guide plate 720.

When the light reflecting plate 740, the light guide plate 720 for enhancing the brightness of the light, the diffusion sheets 730 and the lamp assembly 714 are received in the receptacle 750, the liquid crystal display panel assembly 600 is fixedly mounted on the diffusion sheets 730 in the receptacle 750.

Then, the top chassis 900 is disposed on the liquid crystal display panel assembly 600 to protect the liquid crystal display panel assembly 600 for preventing a departure of the liquid crystal display panel assembly 600. The top chassis 600 is combined with the receptacle 750 in such a manner as hooks of the top chassis 600 is latched to hooks of the receptacle 750. Accordingly, the assembly of the liquid crystal display module is accomplished.

Finally, the liquid crystal display module is covered with the front cases 1010 and rear case 1020 thereby finishing the manufacture of the liquid crystal display device 1100.

As described above, as the recesses for enhancing the brightness of the light, which are formed in the bottom surface of the light guide plate, reflect the light and the light collecting grooves collect the light when the light is generated by the lamp and incident to the light guide plate, the brightness of the light can be greatly improved. As a result, there is an advantage in that the consumption of the electric energy to obtain the desired brightness of the light is reduced Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A backlight assembly comprising:

a lamp assembly for generating a first light to emit the light; and a first light guide plate for enhancing a brightness of the first light, the first light guide plate including a body for guiding the first light exiting from the lamp assembly, the body having a plurality of side faces, upper and bottom faces connected to the side faces, the bottom face having brightness enhancing recesses for enhancing the brightness of a second light incident on the body, the second light reflected to the side faces so that the second light has a different pathway from each other in the body, each of the brightness enhancing recesses having at least three side walls for reflecting the second light to the upper face, wherein each of the side walls having a trigonal shape, and each of areas of the side walls are different corresponding to the amount of the second light reflected from the side walls, and the brightness enhancing recesses having a polyhedron horn shape.

2. A backlight assembly as claimed in claim 1, wherein a first portion of the brightness enhancing recesses which are closest to the lamp assembly has a first size and a first density and a second portion of the brightness enhancing recesses which are farther away from the lamp assembly has a second size greater than the first size and a second density less than the first density.

3. A backlight assembly as claimed in claim 1, wherein a sidewall of each of the brightness enhancing recesses which is closest to the lamp assembly has a larger area than a rest sidewall of each of the brightness enhancing recesses.

4. A backlight assembly as claimed in claim 1, wherein the brightness enhancing recesses has a shape selected from the group consisting of a trigonal horn shape, a tetragonal horn shape and a pentagonal horn shape.

5. A backlight assembly as claimed in claim 1, wherein the first light guide plate has at least one first light collecting groove, which is formed in a second direction perpendicular to the first direction on an upper surface thereof and has a V-shape in a sectional view.

6. A backlight assembly as claimed in claim 5, further comprising:

a second light guide plate having an engagement groove formed at the bottom surface thereof and a second light collecting groove formed in the first direction on an upper surface of the second light guide plate, wherein the engagement groove is engaged with the first light collecting groove and the second light collecting groove has a V-shape in a sectional view.

7. A liquid crystal display device, comprising:

a liquid crystal display panel assembly for controlling liquid crystal to generate a precise image display;

a back light assembly including a lame assembly and a light guide plate;

a lamp assembly for generating a first light to emit the light; and a light guide plate for enhancing a brightness of the first light, the light guide plate including a body for guiding the first light exiting from the lamp assembly, the body having a plurality of side faces, upper and bottom faces connected to the side faces, the bottom face having brightness enhancing recesses for enhancing the brightness of a second light incident on the body, the second light reflected to the side faces so that the second light has a different pathway from each other in the body, each of the brightness enhancing recesses having at least three side walls for reflecting the second light to the upper face, wherein each of the side walls having a trigonal shape, and each of areas of the side walls are different corresponding to the amount of the second light reflected from the side walls, and the brightness enhancing recesses having a polyhedron horn shape.

* * * * *